M. H. OWEN.
VALVE.
APPLICATION FILED SEPT. 3, 1909.
970,387.
Patented Sept. 13, 1910.
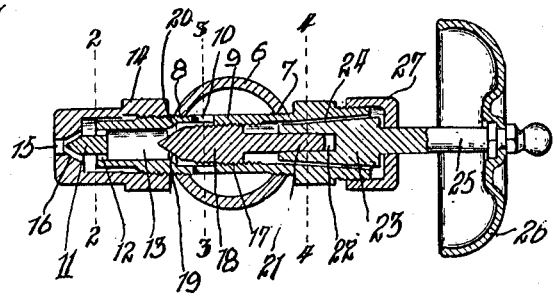
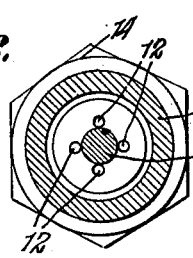 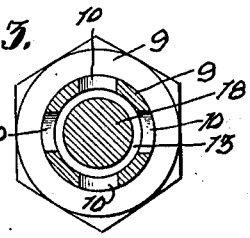 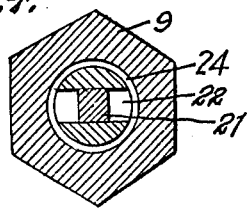
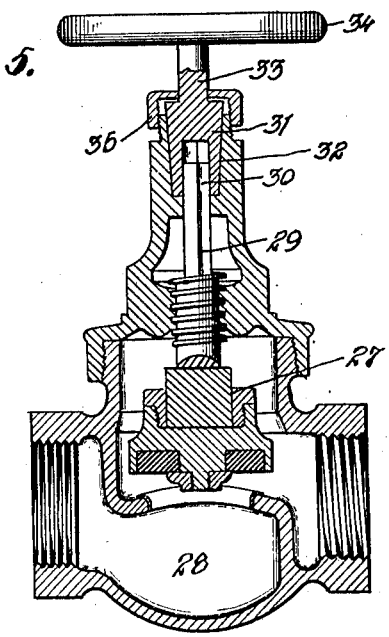
Witnesses:
Wm P. Bond
Ephraim Banning
Inventor:
Matthew H Owen
by Banning & Banning
Attys.

UNITED STATES PATENT OFFICE.

MATTHEW H. OWEN, OF CHICAGO, ILLINOIS.

VALVE.

970,387.

Specification of Letters Patent. Patented Sept. 13, 1910.

Application filed September 3, 1909. Serial No. 516,105.

*To all whom it may concern:*

Be it known that I, MATTHEW H. OWEN, a citizen of the United States, residing at Chicago, in the county of Cook and State of Illinois, have invented certain new and useful Improvements in Valves, of which the following is a specification.

This invention relates more particularly to valves used for controlling a supply of gas or steam; and has for its object to construct a valve which will, without the use of packing of any kind, maintain a constant tight joint at the point where the valve stem enters the casing, preventing leakage at that point; and to provide means, in the form used for controlling a supply of gas, for regulating the supply independent of the controlling valve at the main supply pipe.

The invention consists in the features of construction and combination of parts hereinafter described and claimed.

In the drawings, Figure 1 is a sectional elevation of the form of valve used for controlling a supply of gas; Fig. 2 a section on an enlarged scale taken on line 2—2 of Fig. 1; Fig. 3 a section on an enlarged scale taken on line 3—3 of Fig. 1 the supply pipe being removed; Fig. 4 a section on an enlarged scale taken on line 4—4 of Fig. 1; and Fig. 5 a sectional elevation of the form of valve used for controlling the supply of steam.

In Fig. 1 is shown a main supply pipe 6 having therein screw-threaded openings 7 and 8, into which is screw-threaded a valve casing 9. The opening 7 is somewhat larger than the opening 8, to enable the forward end of the valve casing to pass through the opening 7 in assembling the device. The valve casing 9 is provided, at a suitable point, with a plurality of openings 10 which communicate with the interior of the main supply pipe. The valve casing is provided, on its forward end, with a valve plug 11, located adjacent to which are a plurality of openings 12 communicating with a chamber 13 of the valve casing. A cap 14 is screw-threaded onto the forward end of the valve casing and is provided with an outlet 15, and has formed on its interior a seat 16 for the plug 11. On the interior of the valve casing 9, at a point adjacent to the openings 10, is a screw-threaded surface 17 which receives a screw-threaded valve member 18, having a tapered end 19 for which a seat 20 is formed on the interior of the valve casing. The valve member is provided with a squared stem 21 which enters a rectangular slot 22 formed in the end of a tapered plug 23, which finds a seat within a tapered chamber 24 formed in the interior of the valve casing. The plug 23 has formed integral therewith a stem 25 connected to a handle 26.

As shown in the drawings, the connection between the valve member and the plug is formed by a squared stem on the valve entering a rectangular recess in the plug. I do not desire, however, to limit myself to this particular method of connection, as there are obviously many well known methods which may be employed that would form a connection having the same properties as the one shown.

A cap 27 is screw-threaded onto the rear end of the valve casing and is adapted to bear against the plug 23, so that as the plug becomes worn, by regulating the cap, the plug will be forced inward and will be kept in close contact with the walls of the tapered chamber, preventing leakage at the point where the plug enters the valve casing.

In Fig. 5 is shown a steam valve 27 within a casing 28, the valve stem 29 of which is squared and enters a squared slot or opening 30 formed in a tapered plug 31 seated within a chamber 32. The tapered plug has formed integral therewith a stem 33 connected to a handle 34. A cap 35 is screw-threaded onto the upper end of the valve casing, and is adapted to bear against the plug 31 and perform the same function, with respect to the plug, as does the cap 27.

The operation is as follows: By turning the handle the tapered plug 23 will be rotated, which movement of the plug will rotate the valve member 18 and cause it to travel back and forth along the screw-threaded surface 17 on the interior of the valve casing, opening and closing the valve and controlling the supply of gas from the main supply pipe to the interior of the valve casing. By regulating the cap 14, located on the forward end of the valve casing, the space around the valve plug 11 and its seat may be decreased and increased, as desired, allowing the full volume of gas or only a portion thereof to escape through the outlet 15 to the point of combustion, so that, even when the valve plug 18 is open to its fullest extent, but a small portion of gas will enter to the point of combustion, if so desired.

The operation of the form shown in Fig. 5 is similar, in all respects, to the above, except that no means are provided for regulating the supply, irrespective of the valve; and briefly is as follows: By turning the handle 34 the plug 31 will be rotated, which will cause the rotation of the valve 27, allowing it to travel back and forth along the screw-threaded surface and raise and lower the valve plug controlling the supply of steam.

It will be seen from the foregoing description that the method of operating the valve is one which permits the use of the tapered plug on the handle, thus maintaining a tight joint where the stem on the handle enters the valve, preventing leakage at this point, which is the point where leakage most frequently occurs in valves of this character, and this without the use of packing, springs, or other mechanical contrivances, which are liable to become inefficient after a period of use.

I claim:

1. In a valve, the combination of a valve casing, screw-threaded on a portion of its interior, and having a plurality of openings formed in its walls communicating with the interior of a main supply pipe, a screw-threaded valve member operating within the screw-threaded portion of the valve casing, a seat for said valve member formed on the interior of the casing, a tapered plug located within a chamber formed in the valve casing, a squared opening in said plug, a squared stem on the valve member engaging said opening, and means for rotating the plug to feed the valve member back and forth, substantially as described.

2. In a valve, the combination of a valve casing, screw-threaded on a portion of its interior, and having a plurality of openings formed in its walls communicating with the interior of a main supply pipe, a screw-threaded valve member operating within the screw-threaded portion of the valve casing, a seat for said valve member formed on the interior of the casing, a tapered plug located within a chamber formed in the valve casing, a squared opening in said plug, a squared stem on the valve member engaging said opening, a cap screw-threaded onto the valve casing and bearing against the plug, for keeping the plug in close engagement with the walls of the chamber, and means for rotating the plug to feed the valve member back and forth, substantially as described.

3. In a valve, the combination of a valve casing, screw-threaded on a portion of its interior, and having a plurality of openings formed in its walls communicating with the interior of a main supply pipe, a screw-threaded valve member operating within the screw-threaded portion of the valve casing, a seat for said valve member formed on the interior of the casing, a tapered plug located within a chamber formed in the valve casing, a squared opening in said plug, a squared stem on the valve member engaging said opening, a cap screw-threaded onto the valve casing and bearing against the plug, for keeping the plug in close engagement with the walls of the chamber, means for rotating the plug to feed the valve member back and forth, a valve plug on the forward end of the valve casing, a cap screw-threaded to the forward end of the valve casing, and a seat for the valve plug formed in the cap, the seat terminating in an outlet formed in the front wall of the cap, substantially as described.

MATTHEW H. OWEN.

Witnesses:
FRANCES M. FROST,
EPHRAIM BANNING.